INVENTORS
ROBERT W. CASHMAN
ANTHONY WASCO, JR.
BY

ATTORNEYS

INVENTORS
ROBERT W. CASHMAN
ANTHONY WASCO, JR.

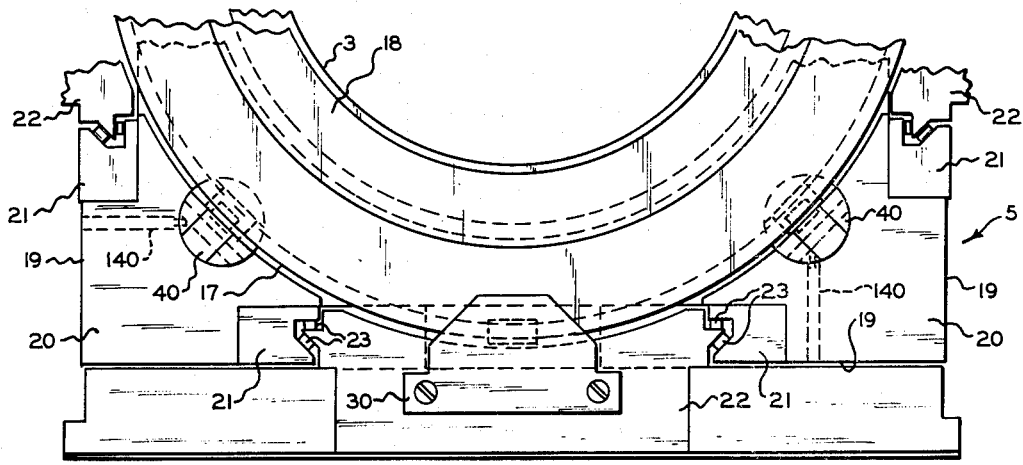
FIG. 3
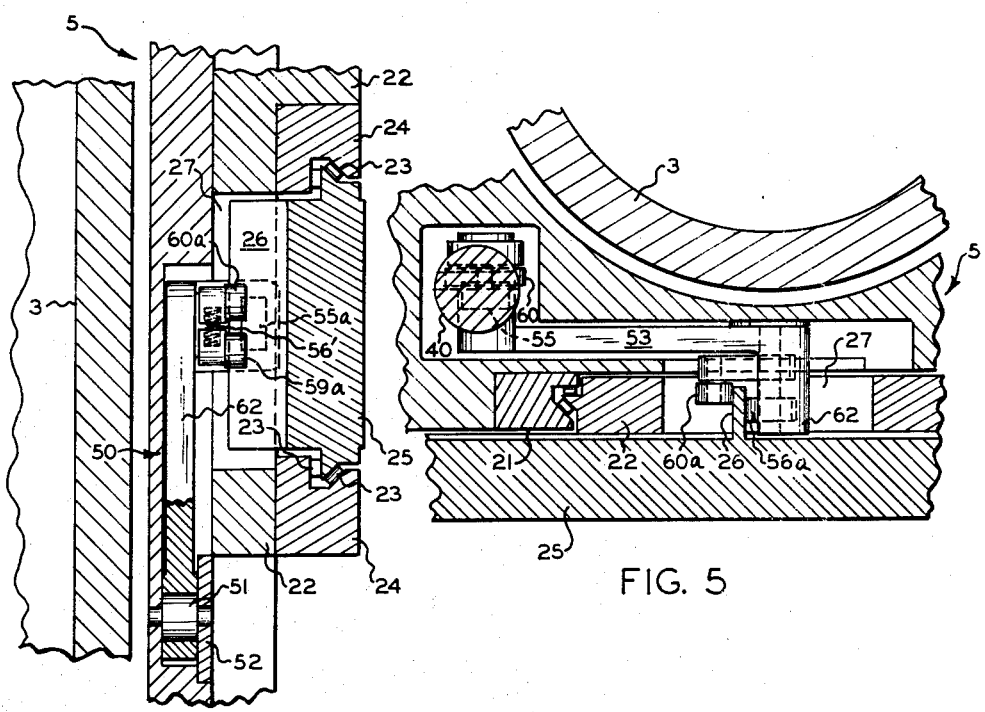
FIG. 4
FIG. 5
INVENTORS
ROBERT W. CASHMAN
ANTHONY WASCO, JR.
BY
ATTORNEYS 3,203,316
MACHINE TOOL CONSTRUCTION
Robert W. Cashman and Anthony Wasco, Jr., Saginaw, Mich., assignors to Saginaw Machine and Tool Company, Saginaw, Mich., a corporation of Michigan
Filed Apr. 30, 1963, Ser. No. 276,945
16 Claims. (Cl. 90—15)

This invention relates to machine tools and more particularly to multiple spindle machine tools of the kind adapted to perform automatically any one or a number of operations on a workpiece. For example, machines of the kind with which the invention is concerned are capable of boring, milling, facing, turning, grinding, or performing any combination of such operations on a workpiece.

Machines of the general class to which the invention relates have been proposed heretofore and, for some purposes, have been satisfactory. Known machines, however, are incapable of meeting the present day high production, precision operations demanded of them. Accordingly, a principal object of this invention is to provide an automatic machine tool of the kind referred to which is capable of high production of extremely high precision workpieces.

Another object of the invention is to provide an automatic machine tool construction which lends itself to use as a continuously or intermittently operable machine.

A further object of the invention is to provide a machine tool having slide assemblies movable in different planes and wherein the apparatus for effecting movements of the slides functions in such manner as to avoid the imposition of stresses on the slides which would tend to result in erratic performance of the machine.

Another object of the invention is to provide a machine tool construction of the kind referred to wherein the slides are operated from a cam member, and wherein the cam member is capable of replacement by any one of a number of different cams to enable the machine to operate upon a multiplicity of different kinds of workpieces.

A further object of the invention is to provide a cam operated machine tool construction wherein positively operable, self-contained means assures faithful following of the contour of the cam.

Another object of the invention is to provide a machine tool of the cam actuated type and which avoids the necessity of having to rely upon external devices to maintain the cam followers in intimate engagement with the cams.

Other objects and advantages of the invention will be pointed out specifically or will become apparent from the following description when it is considered in conjunction with the appended claims and the accompanying drawings, in which:

FIGURE 3 is a fragmentary, top plan view taken in the direction of the arrows 3—3 on FIGURE 2;

FIGURE 4 is a detailed sectional view taken on the line 4—4 of FIGURE 2; and

FIGURE 5 is a sectional view taken on the line 5—5 of FIGURE 2.

Figure 1:
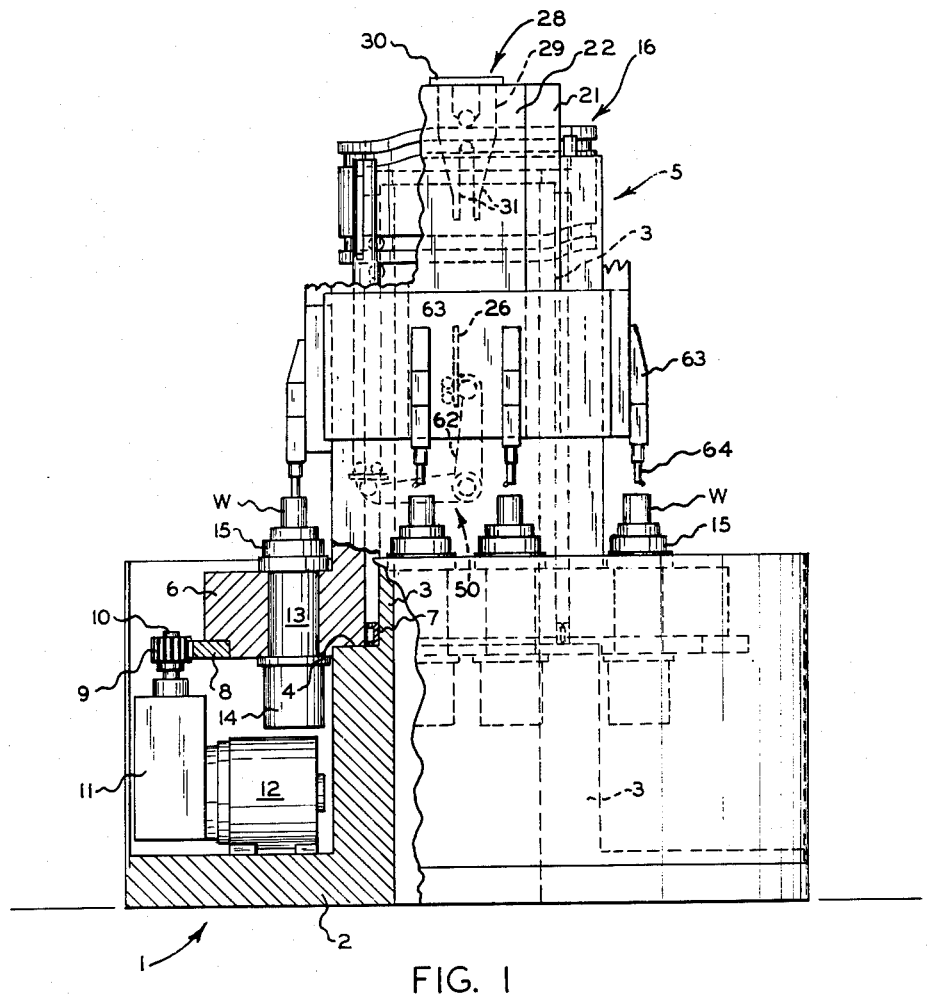
FIGURE 1 is a fragmentary view partly in front elevation and partly in section of a machine tool constructed in accordance with the invention.

A machine constructed in accordance with the illustrative embodiment of the invention comprises a frame 1 composed of a base 2 on which is supported a centrally located, upstanding, tubular column 3 provided with an external shoulder or bearing surface 4 between its ends. Mounted on the frame 1 is a turret or support 5 having a peripheral flange or table 6 which is mounted on the bearing surface 4 for rotation about the axis of the column 3. A plurality of radial bearings 7 may be interposed between the column 3 and the turret 5.

Means is provided for effecting relative rotation between the support 5 and the frame 1 and comprises a ring gear 8 bolted or otherwise suitably fixed to the table 6 and having its teeth in mesh with the teeth of a pinion 9 that may be fixed to the output shaft 10 of a speed reduction unit 11 which is driven by an electric motor 12. Supported by and movable with the table 6 is a plurality of spindle housings 13, each of which includes a rotatable spindle (not shown) that may be driven by its own motor 14 and be operatively connected to a work holder or chuck 15 in which is releasably clamped a workpiece W. The parts 13, 14 and 15 are illustrated diagrammatically in the drawings, and it is preferred that the spindles and chucking devices be the kind shown in co-pending application Serial No. 172,261, filed February 9, 1962, now Patent No. 3,149,852, issued September 22, 1964, and to which reference may be had for a more detailed description.

Fixed at the upper end of the column 3 is a generally cylindrical, drum-type cam member 16. The cam member preferably is hollow and has a wall 17 of substantial thickness, but has a sufficiently large inside diameter as to fit over the column 3. Between its ends the cam member is provided with an inwardly directed flange 18 which overlies the upper end of the column 3 and may be bolted or otherwise removably fixed to the latter.

The construction and arrangement of the apparatus thus far described are such that the cam 16 is supported on the stationary frame 1 and the support member 5 is rotatable. It would be possible, however, to support the cam 16 in such manner that it rotates and the member 5 remains stationary and the manner in which such a construction could be provided will be readily apparent to those skilled in the art. The important consideration is that the cam member 16 and the member 5 are relatively movable.

The support member 5 is substantially square in plan to provide four faces 19. Each of the four sides adjacent the upper end of the member 5 is vertically slotted to provide a pair of spaced apart, substantially parallel members 20, and the confronting edges of each pair of members 20 have secured thereto slideways 21. Between each pair of slideways 21 is a vertically reciprocable slide member 22 which is slideable on rollers 23 interposed between the slideways 21 and the slide 22. Preferably, the construction of each slide, the slideways and their associated parts correspond to the construction disclosed in co-pending application Serial No. 172,266, filed February 9, 1962.

Adjacent its lower end, the vertically reciprocable slide 22 carries a pair of spaced apart, parallel slideways 24, similar to the slideways 21, and between which is mounted a horizontally reciprocable cross slide 25 that is similar to the slide 22. Rollers 23 are interposed between the slide 25 and its slideways. An operating plate or flange 26 having parallel, planar, opposed surfaces extending axially of the drum 16 is secured to the rear or inner surface of the cross slide 25 and projects through an opening 27 formed in the slide 22 for a purpose presently to be explained.

Figure 2:
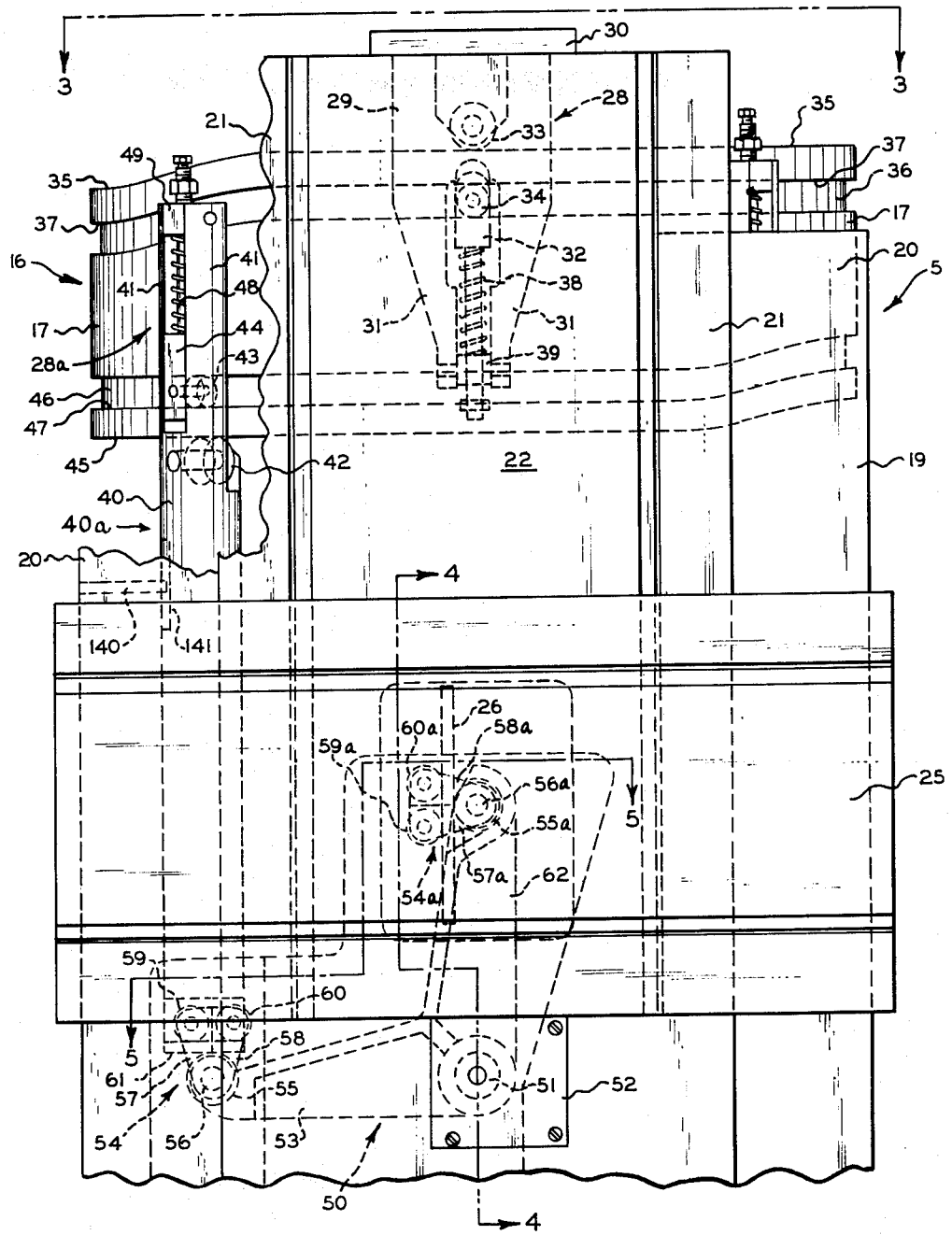
FIGURE 2 is a fragmentary view, on an enlarged scale, of a portion of the apparatus shown in FIGURE 1.

Means is provided for effecting reciprocating movements of each slide 22 in response to relative movement between the support member 5 and the cam 16. Such means comprises a cam follower or clamp device 28 for each slide 22. Each of the devices 28 is identical and preferably is of the kind disclosed in FIGURES 1–5 of co-pending application Serial No. 220,472, filed August 30, 1962, and need not be described in detail. Briefly, however, each device 28 comprises a frame 29 terminating at one end in a mounting flange 30 which may be bolted or otherwise fixed to the associated slide 22. The frame includes a pair of spaced apart legs 31 between which is mounted a reciprocable carrier 32. Journaled on the frame 29 for rotation about a fixed axis is a cam roller or follower 33, and supported by the carrier 32 and reciprocable with the latter is a cam follower or roller 34. The cam follower 33 engages and rides upon the upper end of the wall 17 of the cam member 16 which is contoured to form a cam surface 35. The wall 17 of the cam member is provided with an annular groove 36 adjacent the cam surface 35 so as to provide a cam surface 37 which parallels and is opposed to the cam surface 35. The cam follower 34 is received in the groove 36 and is constantly urged into engagement with the cam surface 37 by means of a spring 38 which reacts between the carrier 32 and a block 39 spanning the distance between the two legs 31.

The construction and arrangement of each cam follower device 28 is such that it supports its associated slide 22 on the cam 16 so that relative movement between the members 5 and 16 causes movements of the slide 22 axially of the drum according to the rise and fall of the cam surfaces 35 and 37. The capacity of each spring 38 is sufficiently great to overcome the mass of the slide 22 and the parts supported thereon, thereby assuring sufficient clamping forces on the cam surfaces 35 and 37 to promote faithful following of the cam surfaces by the followers 33 and 34. Moreover, the directly opposed rollers 33 and 34 act on their respective cam surfaces in such manner as to preclude the imposition of any torsional forces on the slide 22 which would tend to rock the latter in a vertical plane.

Motion transmitting means 40a independent of the slide 22 and its associated parts is provided to reciprocate each cross slide 25. Each cross slide actuating mechanism is identical and comprises a tappet 40 reciprocably mounted in the member 5 to one side of the associated slide 22. Rotation of the tappet is precluded by a key 140 that is slideably received in a slot 141 formed in each tappet. The upper end of each tappet is bifurcated to form two legs 41 that correspond to the legs 31 of the cam follower device 28, and each tappet includes at its upper end a cam clamp or follower device 28a similar to the device 28.

Each follower device 28a includes a follower roller 42 journaled on the tappet 40 to rotate about a fixed axis and a second follower roller 43 journaled on a carrier 44 that is slideably supported between the legs 41. The roller 42 bears against the lower end of the cam drum wall 17 which is contoured to form a cam surface 45. The wall 17 is provided with an annular groove 46 adjacent the cam surface 45 so as to provide another cam surface 47 that is parallel to and opposes the cam surface 45. The follower roller 43 is received in the groove 46 and is forcibly urged against the cam surface 47 by means of a spring 48 that acts between the carrier 44 and a block 49 that is secured between the legs 41. The arrangement is such that relative rotation between the members 5 and 16 causes the tappet 40 to be reciprocated axially of the drum in accordance with the contour of the cam surfaces 45 and 47.

Positively operable means is provided for interconnecting the cross slide actuating mechanism and the cross slide 25 and comprises a bell crank 50 which is pivoted on a stub shaft 51 that is journaled at its opposite ends in the member 5 and in a plate 52 which is fixed to the member 5. One arm 53 of the bell crank extends toward the tappet 40 and carries at its end a clamp device 54 which preferably is of the kind disclosed in FIGURES 6–11 of the aforementioned application Serial No. 220,472. Briefly, however, the clamp apparatus 54 comprises a roller 55 journaled on a shaft 56 that is carried by the bell crank arm 53. Also journaled on the shaft 56 is a pair of rockable arms 57 and 58 that are constantly urged to rotate away from one another by spring means 56' (see FIGURE 4) interposed therebetween. Each of the arms 57 and 58 journals a roller 59 and 60, respectively. The lower end of the tappet 40 is provided with a flat plate 61 having parallel, opposed surfaces. The plate 61 is clamped between the roller 55 and the rollers 59, 60 so that vertical movements of the tappet 40 will cause the bell crank 50 to be rocked about the axis of the shaft 51.

The bell crank 50 includes a second arm 62 on which is mounted at its free end a clamp member 54a which is identical in all respects to the member 54 and having its parts represented by similar reference characters, followed by the suffix a. The operating plate 26 is positively clamped between the roller 55a and the rollers 59a and 60a so that rocking movement of the bell crank in either direction will effect direct movement of the cross slide 25 in one direction or the other.

The arrangement of the operating flange 26 of the slide 25 and the parts of the clamp member 54a is such that the slide 25 can move vertically with the slide 22 without the imposition of any lateral stress on the slide 25. Moreover, since the arms 57, 58 and 57a, 58a of the respective clamp members are journaled on their associated shafts 56, 56a, rocking of the bell crank about its axis permits rocking of the clamp members about the axes of the shafts 56, 56a so as to avoid the imposition of any torsional stresses on the tappet 40 or the slide 25.

A particular advantage of the clamp devices 54 and 54a is that, regardless of the position of the clamp 54 on the plate 61 and the position of the clamp 54a on the operating member 26, any force exerted on the member 40 or on the slide 25 by rocking of the bell crank must be truly longitudinal of the respective members 40 and 25. In other words, regardless of the position at which the clamp member 54 engages the operating plate 26, rocking movement of the bell crank 50 in either direction will impose either a pushing or pulling force on the slide 25 which is truly parallel to the longitudinal axis of the latter, thereby avoiding any tendency to rock the slide in a vertical plane. The same observation applies to the relationship between the clamp 54 and the tappet 40.

Each of the slides 25 is adapted to support one or more tool holders 63, each of which carries a tool 64 that is adapted to engage and cut the associated workpiece W. If desired, the tool holder 63 may be replaced by grinding fixtures of any one of a number of constructions.

In the operation of the apparatus, the motor 12 may be energized so as to drive the support member 5 and the table 6 in a circular path around the column 3. One side of the machine constitutes a loading and unloading station where workpieces W may be placed on and removed from two of the chucks 15. At this station the chucks 15 preferably are stationary, although the table 6 may rotate either continuously or intermittently. When workpieces have been loaded on two spindles at the work station, continued rotation of the member 5 will cause the cam follower devices 28 and 28a to follow the contours of the cam member 16 so as to effect movement of the slides 22 in a vertical path and movement of the slides 25 in a horizontal path so as to cause the tools 64 to operate upon the workpieces in accordance with the contours formed on the cam.

Upon the completion of 360° rotation of the member 5 relative to the cam, the two workpieces that were placed in the chucks 15 will have been completely machined or ground. The finished workpieces then may be removed and other, unfinished workpieces substituted therefor. It will be understood that during operation of the machine, an operator will replace finished workpieces with unfinished workpieces each time a set of spindles reaches the loading and unloading station.

As has been indicated earlier, the cam member 16 is truly cylindrical and the cam surfaces are formed with rises and falls that parallel the longitudinal axis of the cam. This arrangement enables the rises and falls of the cam surfaces to be much steeper than could be provided on radial cams, thereby permitting more rapid movements of the tools 64 relatively to the workpieces. Moreover, since each slide is, in effect, clamped directly to its associated cam by wholly self-contained, internal means, extremely faithful tracking of the slides is possible even at substantially higher cam speeds than have been used heretofore.

The faithful tracking of the cam follower devices and the avoidance of the imposition of torsional forces on the slides, coupled with the clamping of the cams and the slides, enable machines constructed in accordance with the invention to produce great quantities of workpieces to extremely precision tolerances and at relatively high speeds.

The disclosed embodiment is representative of a presently preferred form of the invention, but is intended to be illustrative rather than definitive thereof. The invention is defined in the claims.

We claim:

1. A machine tool comprising a frame; a support member mounted on said frame; a cam member mounted on said frame; means operatively connected to one of said members for moving the latter relatively to the other of said members; a first slide; first cam follower means in engagement with said cam member and mounting said first slide thereon for movement relative to said support member; a second slide mounted on said first slide for movement with the latter and for reciprocating movements relative thereto; second cam follower means in engagement with said cam member; and motion transmission means interconnecting said second cam follower means and said cam member for reciprocating the latter independently of said first slide.

2. A machine tool comprising a frame; a support member; a drum member having at least one cam surface formed thereon, said cam surface being parallel to the longitudinal axis of said drum member; means operatively connected to one of said members for moving the latter relatively to the other of said members; a slide; means mounting said slide on said support member for movement transversely of said axis; cam follower means in engagement with said cam surface; and motion transmitting means extending between and interconnecting said cam follower means and said slide for effecting reciprocating movements of said slide in response to relative movement between said drum member and said support member, said motion transmitting means comprising crank means rockably mounted on said support member, said crank means including clamp means connecting said crank means and said slide.

3. The construction set forth in claim 2 wherein said motion transmitting means includes tappet means reciprocable axially of said drum member and rockably connected to said crank means.

4. A machine tool construction comprising a frame; a support member mounted on said frame; a cam member mounted on said frame; means operatively connected to one of said members for effecting relative movement therebetween; a slide mounted on said support member for reciprocating movement; an operating part having opposed surfaces mounted on said slide between its ends; clamp means in engagement with said opposed surfaces and clamping said operating part; cam follower means in engagement with said cam surface; and motion transmitting means interconnecting said cam follower means and said clamp means for moving the latter in response to movement of said cam follower means.

5. The construction set forth in claim 4 wherein said operating part extends laterally of the path of reciprocation of said slide.

6. A machine tool construction comprising a frame; a support member mounted on said frame; a cam member mounted on said frame; means operatively connected to one of said members for effecting relative movement therebetween; a first slide mounted on said support member for reciprocating movements; a second slide mounted on said first slide for movements with the latter and for reciprocating movements transversely thereof; first cam follower means in engagement with said cam member and connected to said first slide member for effecting movements of the latter in response to relative movement of said members; second cam follower means in engagement with said cam member; means mounting said second follower means for movement relative to said support member in response to relative movement of said support member and said cam member; and positively operable motion transmitting means interconnecting said second follower means and said second slide for directly imparting movement to the latter in either direction of its reciprocating movement in response to relative movement of said support member and said second follower means.

7. The construction set forth in claim 6 wherein said motion transmitting means comprises an operating part extending from said second slide in a direction laterally of the path of reciprocation of said second slide.

8. The construction set forth in claim 7 wherein said motion transmitting means comprises rotatable means gripping said operating part on opposite sides of the latter and operable to permit said operating part to move between said rotatable means in the path of reciprocation of said first slide.

9. A machine tool construction comprising a frame; a support member mounted on said frame; a generally cylindrical drum member mounted on said frame and having a plurality of cam surfaces thereon generally parallel to the longitudinal axis of said drum member; means operatively connected to one of said members for effecting relative movement therebetween; a first slide mounted on said support member for reciprocating movements axially of said drum member; first clamp means clampingly interconnecting said first slide and certain of said cam surfaces for effecting reciprocating movements of said first slide in response to relative movement of said members; a second slide supported on said first slide for movements with the latter and for reciprocating movements relatively to said first slide in directions transverse to the longitudinal axis of said drum member; second clamp means clampingly connected to certain other cam surfaces of said drum member; and motion transmission means interconnecting said second clamp means and said second slide for imparting movements thereto in response to relative movements of said members, said motion transmission means including a clamp device in clamping engagement with said second slide.

10. The construction set forth in claim 9 wherein said motion transmission means includes an operating part fixed to said second slide and having opposed, parallel surfaces extending axially of said drum member, and wherein said clamp device engages said opposed surfaces.

11. The construction set forth in claim 10 wherein said clamp device includes rotatable means in engagement with the opposed surfaces of said operating part.

12. A machine tool comprising support means; a first slide mounted on said support means for reciprocating movements; a second slide mounted on said first slide for movements with and relative to the latter; first means operatively connected to said first slide for reciprocating the latter; and second means independent of said first means and operatively connected to said second slide for moving the latter relatively to said first slide, said second means comprising a part connected to said second slide between its ends and extending through an opening formed in said first slide.

13. The construction set forth in claim 12 wherein said part comprises a plate having a pair of planar, opposed surfaces extending parallel to the path of reciprocating movement of said first slide, and wherein said second means includes a clamp device rotatably engaging said opposed surfaces.

14. A machine tool comprising a frame; a support member; a first slide mounted on said support member for reciprocating movements in a first path relative thereto; a second slide mounted on said first slide for movement with the latter and for movement relative to said first slide in a second path transverse to said first path; a cam member supported on said frame; first cam follower means in engagement with said cam member; second cam follower means in engagement with said cam member; means interconnecting said first cam follower means and said first slide for reciprocating the latter; means interconnecting said second cam follower means and said second slide for reciprocating the latter independently of the reciprocation of said first slide; and means operatively connected to one of said members for moving the latter relatively to the other of said members to effect relative movement of said slides and said support member.

15. A machine tool comprising a frame; a support member; a drum member having at least one contoured cam surface formed thereon, the contour of said cam surface being parallel to the longitudinal axis of said drum member; means operatively connected to one of said members for moving the latter relatively to the other of said members; a slide; means mounting said slide on said support member for movement transversely of said axis; cam follower means in engagement with said cam surface and movable axially of said drum member according to the contour of said surface; and motion transmitting means extending between and interconnecting said cam follower means and said slide for applying either pushing or pulling forces on said slide to move the latter in either of two opposite directions in response to relative movement between said drum member and said support member and consequent axial movement of said cam follower means.

16. The construction set forth in claim 15 wherein said drum member has a pair of parallel, opposed cam surfaces formed thereon and wherein said cam follower means is clamped against both of said cam surfaces.

References Cited by the Examiner

UNITED STATES PATENTS

| 1,574,726 | 2/26 | Bullard | 82—3 X |
| 2,356,028 | 8/44 | Bullard. | |
| 2,567,576 | 9/51 | Palumbo | 74—56 |
| 2,912,892 | 11/59 | Hoern | 82—3 |

FOREIGN PATENTS

| 296,820 | 5/32 | Italy. |

WILLIAM W. DYER, Jr., *Primary Examiner.*